(12) United States Patent
Martin et al.

(10) Patent No.: US 10,749,883 B1
(45) Date of Patent: Aug. 18, 2020

(54) AUTOMATIC ANOMALY DETECTOR

(71) Applicant: HRL Laboratories, LLC, Malibu, CA (US)

(72) Inventors: Charles E. Martin, Thousand Oaks, CA (US); Kang-Yu Ni, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 171 days.

(21) Appl. No.: 16/113,837

(22) Filed: Aug. 27, 2018

Related U.S. Application Data

(63) Continuation-in-part of application No. 15/961,706, filed on Apr. 24, 2018.

(60) Provisional application No. 62/577,560, filed on Oct. 26, 2017, provisional application No. 62/500,489, filed on May 2, 2017.

(51) Int. Cl.
*G06F 21/55* (2013.01)
*H04L 29/06* (2006.01)

(52) U.S. Cl.
CPC ...... *H04L 63/1425* (2013.01); *H04L 63/1441* (2013.01); *H04L 63/145* (2013.01)

(58) Field of Classification Search
CPC ........ G06F 21/577; G06F 21/56; G06F 21/55; H04L 63/14; H04L 29/06
See application file for complete search history.

(56) References Cited

U.S. PATENT DOCUMENTS

| 8,578,494 | B1 * | 11/2013 | Engler | G06F 21/552 |
| | | | | 702/179 |
| 10,333,953 | B1 * | 6/2019 | Averbuch | H04L 63/1416 |
| 2016/0148103 | A1 * | 5/2016 | Sarrafzadeh | G06K 9/00348 |
| | | | | 706/46 |
| 2018/0181749 | A1 * | 6/2018 | Kolacinski | G06F 21/55 |

OTHER PUBLICATIONS

L. Lamport, "Time, clocks and the ordering of events in a distributed system," Commun. ACM, vol. 21, No. 7, pp. 558-565, Jul. 1978.

(Continued)

*Primary Examiner* — Izunna Okeke
(74) *Attorney, Agent, or Firm* — Tope-McKay & Associates

(57) ABSTRACT

Described is an automatic anomaly detector that receives a time-series of normal and abnormal activities that include features related to entities within a computing system. A feature coherence graph for the features is constructed, with the graph then clustered such that feature spaces of entities are expanded to include features that live within a same cluster but belong to separate entities. The feature spaces are unified by mapping representations of the features spaces into a Euclidean space of feature vectors. The feature vectors related to each feature are then aligned. Sets of clusters of related abnormal activities are then generated by regressing each feature vector over only those features that it possesses. The sets of clusters are used to detect anomalous behavior. The system then identifies a node within the computer system generating the anomalous behavior and initiates an action to minimize a threat posed by the node.

6 Claims, 3 Drawing Sheets

(56) References Cited

OTHER PUBLICATIONS

Harrington, Andrew Daniel. "Computer profiling for forensic purposes." pp. 1-227, (2009).
Fidge, Colin J. "Timestamps in message-passing systems that preserve the partial ordering" Proceedings of the 11th Australian Computer Science Conference. vol. 10. No. 1. 1988, pp. 56-66.
Mattern, Friedemann. "Virtual time and global states of distributed systems." Parallel and Distributed Algorithms 1.23, (1989): pp. 215-226.
Candes, E., Li, X., Ma, Y. and Wright, J., "Robust Principal Component Analysis?" Journal of the ACM, 58(3), 11 (2011), pp. 1-37.
Cun Mu, Bo Huang, John Wright and Donald Goldfarb, "Square Deal: Lower Bounds and Improved Relaxations for Tensor Recovery", Proceedings of the 31 st International Conference on Machine Learning, Beijing, China, 2014. JMLR: W&CP vol. 32. Copyright 2014 by the author(s), pp. 1-9.
Zhou, T and Tao, D., "GoDec: Randomized low-rank & sparse matrix decomposition in noisy case," Proceedings of the 28th International Conference on Machine Learning (ICML), pp. 33-40 (2011).
Margo, Daniel W., and Robin Smogor. "Using Provenance to Extract Semantic File Attributes." TaPP. 2010, pp. 1-5.
Ediger, David, et al. "Stinger: High performance data structure for streaming graphs." High Performance Extreme Computing (HPEC), 2012 IEEE Conference on. IEEE, 2012, pp. 1-5.
Palo Alto Networks, "WildFire Datasheet", 2014, pp. 1-3.
Debar, Hervé, Marc Dacier, and Andreas Wespi. "Towards a taxonomy of intrusion-detection systems." Computer Networks 31.8 (1999): pp. 805-822.
Tjhai, Gina C., et al. "Investigating the problem of IDS false alarms: An experimental study using Snort." Proceedings of the IFIP TC 11 23rd International Information Security Conference. Springer US, 2008, pp. 253-267.
Yen, Ting-Fang, et al. "Beehive: Large-scale log analysis for detecting suspicious activity in enterprise networks." Proceedings of the 29th Annual Computer Security Applications Conference. ACM, 2013, pp. 199-208.
Kang-Yu Ni and Shankar Rao. "SAR moving target imaging using sparse and low-rank decomposition." SPIE Defense + Security. International Society for Optics and Photonics, 2014, pp. 1-7.
Ni, Kang-Yu, Benvenuto, R. Bhattacharyya, R. Millin. "Feature Transformation of Neural Activity with Sparse and Low-Rank Decomposition", SPIE Medical Imaging, Biomedical Application in Molecular, Structural, and Functional Imaging, 2015, pp. 1-10.
Soltanolkotabi, M., Elhamifar, E. and Candes, E. "Robust Subspace Clustering", The Annals of Statistics, 22, pp. 669-699, (2014).
Elhamifar, E. and Vidal, R. "Sparse Subspace Clustering: Algorithm, Theory, and Applications", IEEE Transactions on Pattern Analysis and Machine Intelligence, 35, pp. 2765-2781 (2013).
Ichino, M. and Yaguchi, H. "Generalized Minkowski Metrics for Mixed Feature-Type Data Analysis", IEEE Transactions on Systems, Man, and Cybernetics, 24, pp. 698-708 (1994).
Thong, S., Khoshgoftaar, T. and Seliya, N. "Clustering-Based Network Intrusion Detection", International Journal of Reliability, Quality and Safety Engineering, 14, pp. 169-187, (2007).
Zanero, S. and Savaresi, S. "Unsupervised Learning Techniques for an Intrusion Detection System", ACM Symposium on Applied Computing, 1, pp. 412-419 (2004).
Kraskov, A., Stogbauer, H., and Grassberger, P. "Estimating Mutual Information". Physical Review E, 69, pp. 366138-1-066138-16 (2004).
Margo, Daniel W., and Robin Smogor. "Using Provenance to Extract Semantic File Attributes." Tappio Proceedings of the 2nd conference on Theory and practice of provenance, pp. 1-5, (2010).
Ediger, David, et al. "Stinger: High performance data structure for streaming graphs." 2012 IEEE Conference on High Performance Extreme Computing, HPEC 2012, 6408680, pp. 1-5, (2012).
Yen, Ting-Fang, et al. "Beehive: Large-scale log analysis for detecting suspicious activity in enterprise networks." Proceedings of the 29th Annual Computer Security Applications Conference, pp. 199-208, 2013.

* cited by examiner

AUTOMATIC ANOMALY DETECTOR

CROSS-REFERENCE TO RELATED APPLICATIONS

The present application is a Continuation-in-Part application of U.S. Ser. No. 15/961,706, filed on Apr. 24, 2018, which is a non-provisional application of U.S. Provisional Application No. 62/500,489, filed on May 2, 2017, the entirety of which are hereby incorporated by reference.

The present application is ALSO a non-provisional U.S. patent application 62/577,560, filed on Oct. 26, 2017, the entirety of which is hereby incorporated by reference.

BACKGROUND OF INVENTION

(1) Field of Invention

The present invention relates to an anomaly detection system and, more specifically, to an automatic anomaly detector that incorporates subspace clustering to link related abnormal system activities.

(2) Description of Related Art

Advanced Persistent Threats (APTs) represent an ever-growing and troublesome challenge in the domain of cyber security. APTs are notoriously difficult to detect and can be highly damaging. Their stealth is manifest by hiding within the voluminous amounts of normal system activities. To detect stealthy APT attacks while maintaining a low false positive rate a method must be able to isolate and link abnormal behaviors that are temporally distant and described by a large number of different features. Of particular difficulty is the fact that of the many possible features that could be used to describe the components of an APT kill chain, only a small fraction of them characterize the relevant commonalities.

Current state-of-the-art machine learning techniques in feature extraction and clustering are ill-equipped to handle the complexities of enterprise-scale cyber-security data, which consists of massive quantities of incomplete, high-dimensional, heterogeneous data that is specified at multiple levels of granularity. This invention overcomes several central challenges that current state-of-the-art methods do not. First, detecting stealthy APT attacks requires moving beyond the current practice of monitoring the signatures of system interactions to analyzing vast quantities of provenance data. Linking activities by common threads of data interaction admits the possibility of far richer analysis, but comes with the burden of representing this information in a manner that is amenable to efficient computation, which current state-of-the-art methods fail to achieve (see Literature Reference Nos. 7, 8 and 9). Second, current state-of-the-art machine learning methodologies can handle high-dimensional data, but are generally not equipped to handle the added challenges of highly heterogeneous data, which is pervasive in the cyber security domains of Advanced Persistent Threats (see Literature Reference Nos. 1, 2, 4 and 5).

Thus, a continuing need exists for a system that automatically detects anomalies and that efficiently overcomes the aforementioned technical challenges.

SUMMARY OF INVENTION

This disclosure is directed to an automatic anomaly detector. In various aspects, the automatic anomaly detector includes one or more processors and a memory. The memory is a non-transitory computer-readable medium having executable instructions encoded thereon, such that upon execution of the instructions, the one or more processors perform several operations. For example, in operation, the anomaly detector receives a time-series of normal and abnormal activities in a computing system. The time-series of normal and abnormal activities having features related to one or more entities within the computing system. A feature coherence graph for the features is constructed, with the feature coherence graph then clustered such that feature spaces of entities are expanded to include features that are/live within a same cluster but belong to separate entities. The feature spaces are unified by mapping representations of the feature spaces into a Euclidean space comprising of feature vectors. The feature vectors related to each feature are then aligned. Sets of clusters of related abnormal activities are then generated by regressing each feature vector over only those features that it possesses. An anomalous behavior is detected by comparing the sets of clusters to normal testing data. Based on that comparison, the system can identify a node within the computer system generating the anomalous behavior and initiate an action to minimize a threat posed by the node.

In yet another aspect, initiating an action to minimize a threat posed by the node generating the anomalous behavior includes isolating the node from the computing system.

In yet another aspect, in constructing the feature coherence graph, the nodes are features describing the entities, and between each node is an undirected connection that is weighted by mutual information of corresponding features.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations as described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
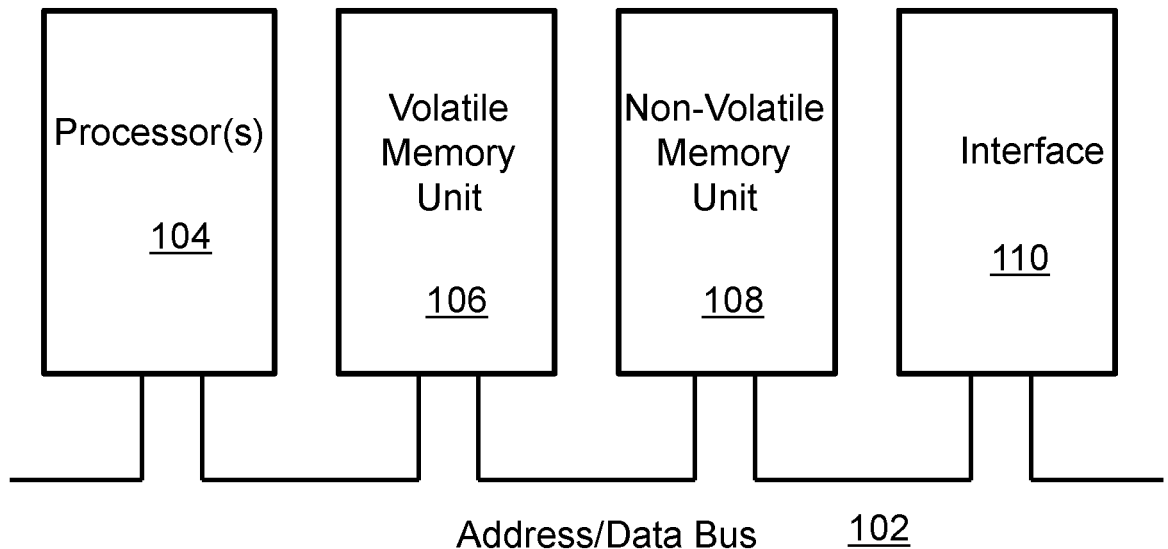
FIG. 1 is a block diagram depicting the components of a system according to various embodiments of the present invention.
Figure 1:
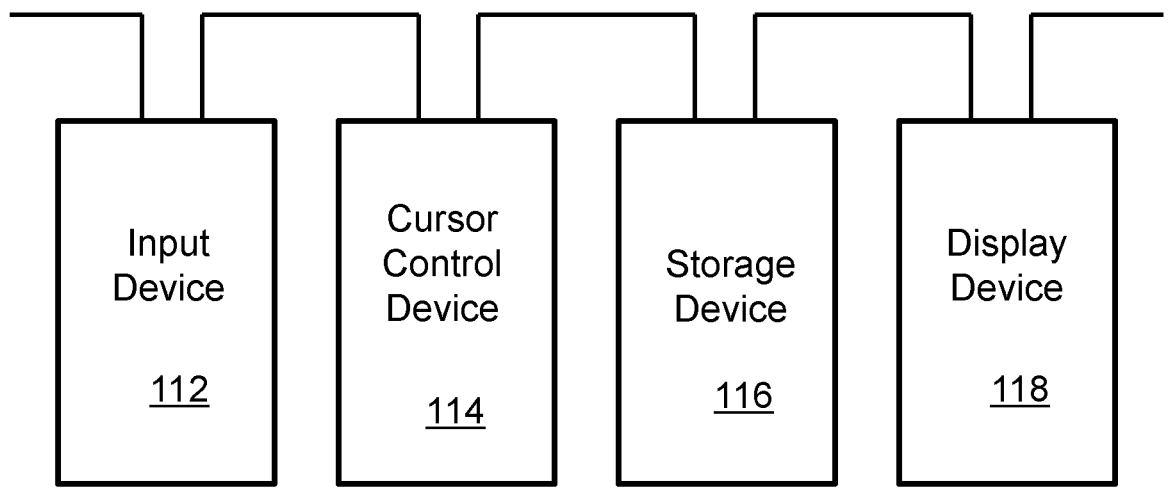

The present invention relates to an anomaly detection system and, more specifically, to an automatic anomaly detector that incorporates subspace clustering to link related abnormal system activities. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Soltanolkotabi, M., Elhamifar, E. and Candes, E. "Robust Subspace Clustering", The Annals of Statistics, 22, pp. 669-699, (2014).
2. Elhamifar, E. and Vidal, R. "Sparse Subspace Clustering: Algorithm, Theory, and Applications", IEEE Transactions on Pattern Analysis and Machine Intelligence, 35, 2765-2781 (2013).
3. Ichino, M. and Yaguchi, H. "Generalized Minkowski Metrics for Mixed Feature-Type Data Analysis", IEEE Transactions on Systems, Man, and Cybernetics, 24, 698-708 (1994).
4. Zhong, S., Khoshgoftaar, T. and Seliya, N. "Clustering-Based Network Intrusion Detection", International Journal of Reliability, Quality and Safety Engineering, 14, 169-187, (2007).
5. Zanero, S. and Savaresi, S. "Unsupervised Learning Techniques for an Intrusion Detection System", ACM Symposium on Applied Computing, 1, 412-419 (2004).
6. Kraskov, A., Stogbauer, H., and Grassberger, P. "Estimating Mutual Information". Physical Review E, 69, 066138-1-066138-16 (2004).
7. Margo, Daniel W., and Robin Smogor. "Using Provenance to Extract Semantic File Attributes." TaPP. 2010.
8. Ediger, David, et al. "Stinger: High performance data structure for streaming graphs." 2012 IEEE Conference on High Performance Extreme Computing, HPEC 2012, U.S. Pat. No. 6,408,680 (2012).
9. Yen, Ting-Fang, et al. "Beehive: Large-scale log analysis for detecting suspicious activity in enterprise networks." Proceedings of the 29th Annual Computer Security Applications Conference, 199-208, 2013.

(2) Principal Aspects

Various embodiments of the invention include three "principal" aspects. The first is a system for automatic anomaly detection. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
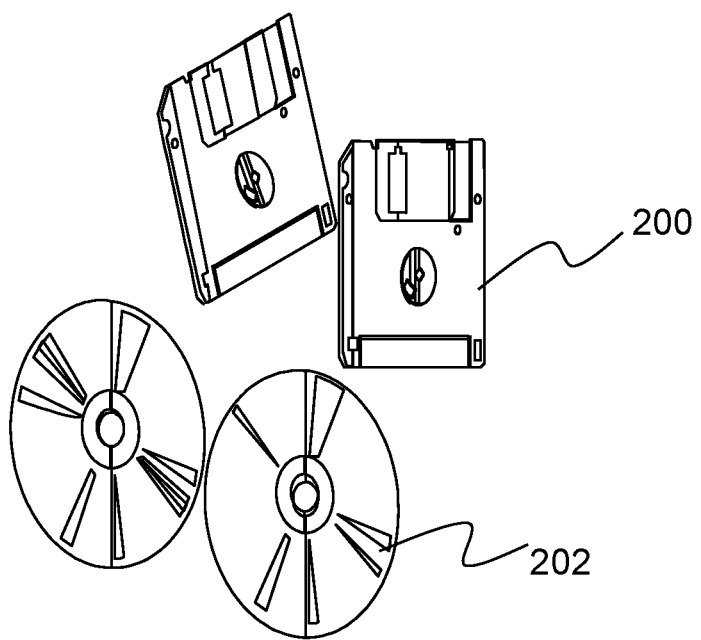
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Advanced Persistent Threats (APTs) represent an ever-growing and troublesome challenge in the domain of cyber security. APTs are notoriously difficult to detect and can be highly damaging. Further, there are several technical challenges overcome by the present system that alternative state-of-the-art approaches are ill-equipped to handle, labeled below as 1 through 4:

1. A wide range of different features and levels of granularity is used to describe entities within large scale computing systems. This makes it very difficult to perform broad comparisons across the spectrum of system activities, which in turn severely limits the completeness of the overall picture of system interactions and interdependencies.
2. The features used to describe system activities are highly heterogeneous. They can be quantitative (continuous or discrete), qualitative (ordinal or nominal), or consist of more complex data structures such as trees. This extreme heterogeneity limits the applicability of many state-of-the-art machine learning techniques.
3. System activities are represented by a vast array of different feature spaces that only partially overlap. This is problematic for many state-of-the-art machine learning methods, which require that the activities live within the same feature space. It is a tougher problem than handling missing or corrupted feature values, because in this domain the features literally do not exist for large subsets of activities.
4. The vectors describing system activities related to an APT attack are high-dimensional, noisy, and small in number. This tends to induce a high false alarm rate, which must be mitigated in this domain due to the large overall number of system activities.

This system of the present disclosure, referred to as the Automatic Anomaly Detector (AAD), is designed to overcome the challenges of the prior art in order to detect APT attacks and dramatically improve the technology in anomaly detection. The AAD overcomes these challenges by incorporating the new Generalized Robust Subspace Clustering (GRSC) method, which is able to link subtly related abnormal system activities that may occur over long-time spans and are obscured by the large amounts of high-dimensional, heterogeneous data that is typical of large-scale computing systems. GRSC endows the system of the present disclosure with feature extraction and clustering capabilities that are essential for significantly reducing the false positive rate (<0.1%) and connecting temporally distant APT events (>1 month separation) that bear only subtle similarities in terms of features and data provenance. The GRSC is to be contrasted with current state-of-the-art pattern recognition and clustering techniques, which are ill-equipped to handle the myriad of data types and different feature spaces that describe the entities and interactions within large-scale computing systems (see Literature Reference Nos. 1, 2, 4 and 5). The state of the art techniques result in a highly incomplete picture of information flow and connectedness within a system, which allows stealthy APTs to hide undetected for long periods of time.

Furthermore, the system of this disclosure incorporates a unique framework called Feature Space Coherence (FSC), which integrates high-dimensional, heterogeneous data into a common mathematical representation across multiple scales of granularity. Thus, the FSC framework allows GRSC to gracefully handle high-dimensional, heterogeneous data in the presence of noise, outliers, small sample sizes, and missing data and features, all of which are pervasive in the cyber security domain. This data-driven technique first expands the feature space describing each type of activity by connecting it with features that define distinct but statistically related activities, thus deriving richer, multi-scale descriptions. Feature space expansion is particularly important in diverse domains such as computer networks, which consist of many different types of components, including hardware (computers, routers, and switches) and software (programs, libraries, and functions) to name just a few. FSC unifies the expanded, heterogeneous description of each system activity by mapping them into high-dimensional Euclidean feature spaces. At this stage different activities will generally live within different Euclidean feature spaces. The last step of this method aligns the different feature spaces during the subspace clustering procedure, which naturally leads to hierarchically structured subspace clusters that provide a multi-scale view of activity interdependencies. The clusters of activities discovered by the GRSC method are used to infer the casual APT kill chain.

The Automatic Anomaly Detector (AAD) invention automatically links abnormal system activities that are described by high-dimensional, heterogeneous features and are separated by large intervals of time. As a non-limiting example, "high-dimensional" means 1000s-10000s of features. Features include, but are not limited to, accesses patterns for programs, operating system calls, features related to data packets sent and received over a network (e.g., timestamps and IP addresses), and read and write operations from/to the hard drive. "Heterogeneous features" refers to the fact that the above-mentioned features (and others) are represented in very different ways. Some of these ways are character strings, bit strings, real numbers, integers, vectors, and tables. "Large intervals of time" refers to a lengthened time period, such as multiple months. A non-limiting example of an abnormal activity is repeated access to a program (e.g., a web-browser) by a file that appeared on the system recently (e.g., within the last week) requesting to send information to an outside server with unknown IP address. Note that the described system can handle high-dimensional, heterogeneous data that spans long time intervals, however, the invention also applies when any or all of these conditions do not hold.

Abnormal activities are passed as input to the system. These activities may be described by features including provenance data among other types of features such as memory access frequency and location. AAD can augment the abnormal activities with additional descriptive features, such as characteristics of program stack and heap dynamics. A goal of the AAD is to use the large quantity of isolated abnormal activities identified by currently available cyber security systems and discover sets of related activities that are indicative of coherent anomalous system behaviors. Construction of anomalous behaviors from related activities is essential for rapid intrusion detection and kill chain construction, especially for APT attacks.

As can be appreciated by those skilled in the art, the anomaly detector described herein can be implemented in any cyber security system or extended and applied to other machine learning problems that involve high-dimensional, heterogeneous data sources, especially those that require linking activities that are separated by long periods of time.

(4) Specific Details of Various Embodiments

Figure 3:
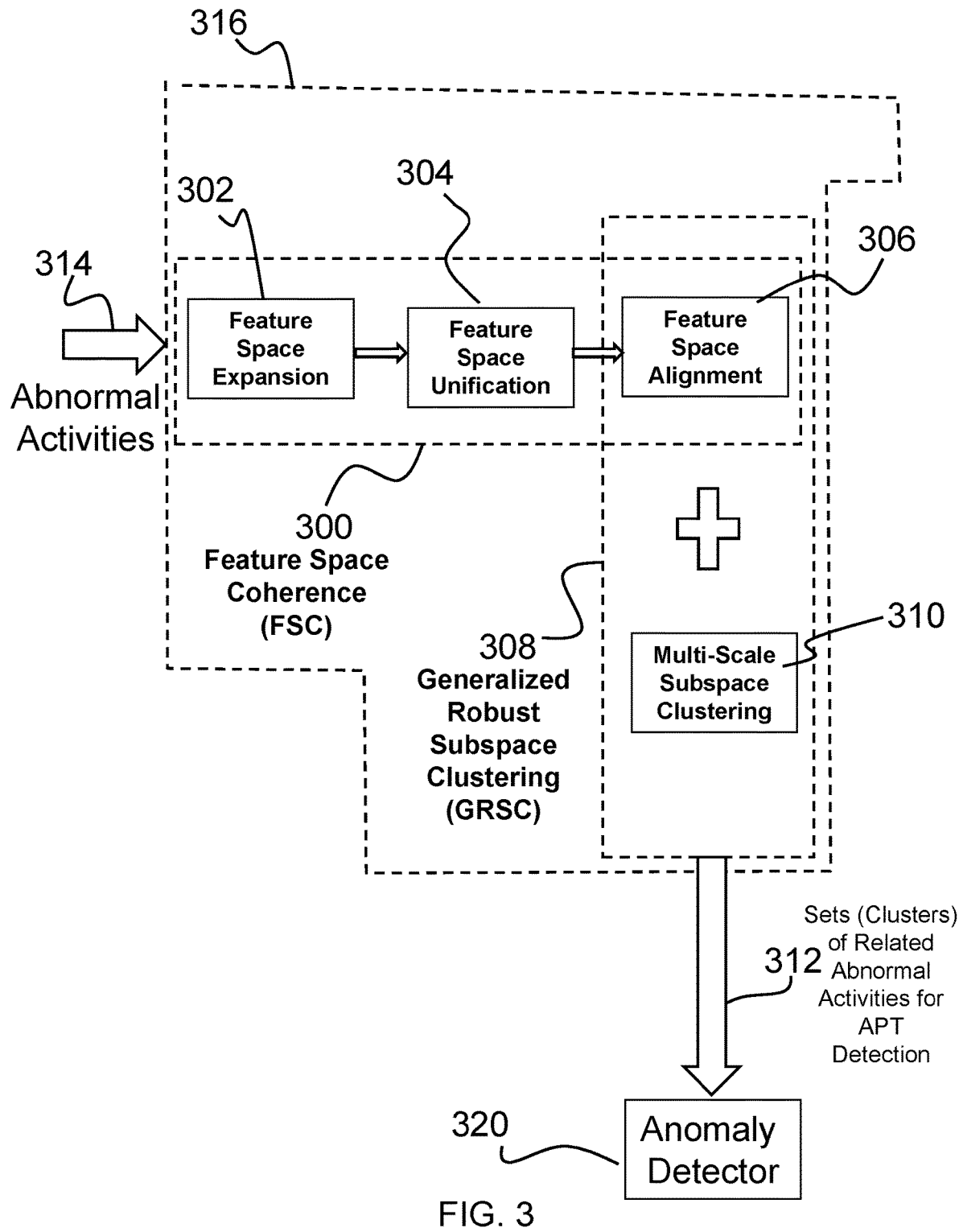
FIG. 3 is a schematic of the Automatic Anomaly Detector (AAD) according to various embodiments of the present invention.

The feature learning component of the anomaly detector is illustrated in FIG. 3. The GRSC methodology incorporates four enabling techniques that allow it to overcome the challenges described above that limit current state-of-the-art techniques. Specifically, Feature Space Coherence 300 overcomes challenges 1 through 3 and is used to generalize the Robust Subspace Clustering algorithm, thereby overcoming challenge 4. The Robust Subspace Clustering algorithm is described in further detail in Literature Reference No. 1.

To overcome the first challenge, the first step in the FSC method 300 is to expand the set of features describing the different system entities such as application programs, modules, and functions. This technique is called Feature Space Expansion 302. Each entity is characterized by a set of features, such as provenance data, size on disk, types of system calls made, use statistics, and location in the local directory, to name just a few of the many possible examples. In modern computer systems entities interact with one another extensively and at multiple levels of granularity. The FSC methodology 300 uses this fact to expand the feature spaces of individual entities and thus generate richer entity-specific descriptions. This feature space enrichment is performed by computing the mutual information between features belonging to different entities and then integrating new features into an entity's representation prompted by large mutual information values (see Literature Reference No. 6 for a discussion on how to compute mutual information). It then becomes possible to compare entities whose feature space representations were previously incompatible (little to no overlap).

The second step in the FSC method 300, referred to as Feature Space Unification 304, overcomes challenge 2 by first mapping non-numeric features into data structures with well-defined metrics. Next the Generalized Minkowski Metric (see Literature Reference No. 3) is employed to rapidly map the heterogeneous feature spaces of mixed data type into homogeneous Euclidean space.

Challenge 3 is overcome by the third step in the FSC method, referred to as Feature Space Alignment 306. The original Robust Subspace Clustering method (see Literature Reference No. 1) is capable of handling missing feature values, but not data points that live in completely different feature spaces. In order to handle the large number of different feature spaces in this domain a new method of measuring the similarity between two data points was developed that is inspired by the sparse regression technique used in the original Robust Subspace Clustering method. This method incorporates a novel weighted L1 regularization term, where the weights are determined a priori based on how well the feature spaces of the different data points align.

The fourth technique is to extend the traditional notion of subspace clusters to hierarchical subspace clusters, which overcomes challenge 4. This is a natural extension in light of the fact that feature spaces in this highly complex domain often exhibit only partial alignment. This last technique enables the Generalized Robust Subspace Clustering method 308, which is a key component in suppressing the false alarm rate. The GRSC method 308 extends the noise robustness and small sample tolerance of the original method to the enterprise-scale computer network domain. Further details regarding each of these processes is provided below.

(4.1) Feature Space Expansion

Feature space expansion 302 is the first step in the AAD process. At this stage there are a wide range of different entities described by many different sets of features. For each entity the objective is to extend its feature space to include features that describe other related entities. The purpose of this extension is to create richer descriptions of the entities and to be able to describe entities with originally disparate feature spaces in terms of one another.

The entities are considered as inputs 314 to the feature space expansion module 302. Non-limiting examples of entities include file and application access patterns, operating system calls, program executions traces, and communication with browser plug-ins. In general, each entity within a computing system is described by a set of features and these features take on different values at different times. Thus, over a given period of time each entity is described by a multivariate time-series of feature values. The method is flexible enough to handle different types of features, including continuous and discrete numeric values, ordinal and nominal labels, and data structures such as sets or arrays. For each pair, a feature coherence graph is constructed, where the nodes are the features describing the entities, and between each node is an undirected connection that is weighted by the mutual information of the corresponding features. Next, the feature coherence graph is clustered. The feature spaces of the entities are expanded to include features that live within the same cluster but belong to separate entities. In this way the expansion (merging of the two feature spaces) is performed only when justified by sufficiently strong relationships between the features. The mutual information between features (weights on graph edges) is used to determine when feature space expansion is justified. A user-defined threshold is set and when the mutual information between features exceeds this threshold the features are merged. The threshold is set based on how it affects predictive performance of the system.

While the number of entities and their feature spaces will typically be quite large, the feature space expansion 302 technique is scalable for the following reasons. A fast and robust, nonparametric mutual information estimate is employed that is based on the K-nearest-neighbors algorithm (see Literature Reference No. 6 for a description of how to estimate mutual information). The mutual information computations, which constitute the bulk of the computational effort in feature space expansion 302, only need to be updated periodically. This is true because the strength of the relationship between two features is a relatively stable characteristic. The bulk of the computational load for feature space expansion 302 can be accomplished up front and the expansion only needs to be updated intermittently.

(4.2) Feature Space Unification

Feature space unification 304 is the second step in the GRSC process. In order to achieve GRSC, it is necessary to map the representation of the many different features spaces into the Euclidean framework. At this stage entities are described by highly heterogeneous mixtures of different feature types including both quantitative and qualitative values. The first step is to map each entity's non-numeric feature types into data structures with well-defined metrics. For example, an entity's nominal features, such as the files it interacts with, can be represented by a set. Importantly, this method does not require that each entity be described by exactly the same set of features. Next, the Generalized Minkowski Metric is used to compute the pairwise distances between the sets of features describing the entities in the system. This metric is given by, $$d_p(\vec{A}, \vec{B}) = \left[\sum_{k=1}^{d} \phi(A_k, B_k)^p\right]^{1/p},$$

where $\vec{A}$ and $\vec{B}$ are entities with d features in common and k is understood to index exactly those common features, and $p \geq 1$. The function $\phi$ is defined by, $$\phi(A_k, B_k) = |A_k \boxplus B_k| - |A_k \boxtimes B_k| + \gamma(2|A_k \boxtimes B_k| - |A_k| - |B_k|),$$

where $k=1, 2, \ldots d$, $0 \leq \gamma \leq 0.5$, $\boxplus$ is the Cartesian join operator, $\boxtimes$ is the Cartesian meet operator, and $|A_k|$ denotes the length of the interval $A_k$ if the $k^{th}$ feature is continuous quantitative, and it is the number of values included in the set $A_k$ if the $k^{th}$ feature is discrete quantitative, qualitative, or structural. The definitions of the Cartesian join and Cartesian meet operators depend on the feature type. For example, if $A_k$ and $B_k$ are sets, then $\boxplus$ is the union and $\boxtimes$ is the intersection. Following the "center of mass" interpretation discussed in (Literature Reference No. 3), the pairwise distances between entities $d_p(\vec{A}_i, \vec{B}_i)$ are used to map the heterogeneous representation of each entity into Euclidean space, thus unifying their representations in a common mathematical framework and setting the stage for GRSC 308.

(4.3) Feature Space Alignment

The third step in the GRSC methodology is feature space alignment 306, which is a direct enhancement of the original Robust Subspace Clustering method. Feature space alignment 306 takes the Euclidian space representations and aligns the various feature vectors related to each feature. To measure the similarity between two data points, Feature Space Alignment 306 uses the amount of overlap/commonality in features that describe these points, in addition to the values of those features, to determine the degree of similarity between them.

At this stage the entities are represented by feature vectors in Euclidean space; however, they live in distinct Euclidean spaces that have different dimensions since each entity is not necessarily described by all available features. The original Robust Subspace Clustering method is not capable of handling this scenario. To overcome this challenge the standard L1 regularization term used in the original algorithm (as described in Literature Reference No. 1) is turned into a weighted term. The original algorithm uses the LASSO method for sparse regression, which is formulated as $$\min_{\beta \in \mathbb{R}^N} \frac{1}{2} \|\vec{y}_i - Y\beta\|_{\ell_2}^2 + \lambda \|\beta\|_{\ell_1} \text{ subject to } \beta_i = 0.$$

Here, Y is the matrix of high-dimensional data points (one data point per column), $\vec{y}_i$ is the $i^{th}$ data point (column of Y), $\beta$ is the vector of regression coefficients, and $\lambda$ is a positive number that controls the sparseness of the regression and is selected in a data-driven manner. To adapt, the second term in the sparse regression is weighed, which then becomes $$\min_{\beta \in \mathbb{R}^N} \frac{1}{2} \|\vec{y}_i - Y\beta\|_{\ell_2}^2 + \lambda \sum_{j \neq i} |\beta_j| \|\vec{f}_i - \vec{f}_j\|_{\ell_1} \text{ subject to } \beta_i = 0.$$

Here, $\vec{f}_i, \vec{f}_j \in \{0,1\}^M$ are binary vectors that indicate which of the M possible features describe entities i and j. A value of 1 means that the specific feature describes the entity, otherwise the value is 0. Intuitively, the weights $\|\vec{f}_i - \vec{f}_j\|_{\ell_1}$ are determined by computing the degree to which the feature spaces of each pair of entities align. If the feature spaces of two entities are identical, then the weight is 0. The weight increases as the similarity between feature spaces decreases. This enhancement seamlessly curtails the influence of mismatched entities while amplifying the effects of entities that bear significant resemblance in terms of their descriptive features.

(4.4) Generalized Robust Subspace Clustering

Having completed the three steps of Feature Space Coherence 300 (Expansion 302, Unification 304, and Alignment 306), there remains one final technique needed to complete the GRSC 308 methodology. In the original RSC method each feature vector (entity representation) is expressed in terms of the other feature vectors through a linear regression. The adaptation is to perform multi scale subspace clustering 310 by regressing each feature vector over only those features that it possesses, regardless of whether or not the other vectors contain additional features. This has the ultimate effect of generating hierarchically structured subspace clusters which is a natural generalization of the original RSC method to complex domains where entities are described by different types of features. Specifically, the output results are sets of clusters 312 of related abnormal activities for APT detection.

For further details, multi-scale subspace clustering 310 is performed as follows. The multi-scale aspect of the subspace clustering component 310 is defined with respect to the first term in the optimization problem given by $$\min_{\beta \in \mathbb{R}^N} \frac{1}{2} \|\vec{y}_i - Y\beta\|_{\ell_2}^2 + \lambda \sum_{j \neq i} |\beta_j| \|\vec{f}_i - \vec{f}_j\|_{\ell_1}.$$

Specifically, assume that $\vec{y}_i \in \mathbb{R}^M$, where M<=S with S being the total number of features. It is usually the case that M is the same for all data points A, but this is not necessarily true in this setting. Therefore, a generalization of robust subspace clustering is to allow M to vary between data points, in which case the regression $\vec{y}_i$-Y$\beta$ is only with respect to those features that a given $\vec{y}_i$ has.

(4.5) Computational Complexity

The feature space expansion 302 can be done offline and only requires infrequent updating. For example, if network infrastructure is overhauled. Feature space unification 304 is done frequently, but is computationally inexpensive. The bulk of the computational expense in the AAD lies in the sparse regressions required by the GRSC 308 process. For example, let the dimensionality of the ambient feature space be p and the number of data points in the regression be n. Due to the wide variety of different features and the fact that the input to the AAD (anomalous activities) is generally small, p>>n. Under this condition the average computational complexity of the LASSO can be made to be O(p).

(4.6) Application to Detection of Anomalous Computer System Activities

Advanced Persistent Threats (APT) create changes in the behavior and characteristics of a computer system. This includes features such as data provenance (who or what has read and written data), size on disk, types of system calls made, use statistics, directory locations accessed, and application programs, modules, and functions called. These are inputs 314 to the feature learner (i.e., collectively depicted as element 316) which then outputs clusters 312 of points in Euclidean space that correspond to related behaviors and characteristics of the computer system. The clusters of points 312 are passed as input to an anomaly detector 320, which is now described.

The first step to building the anomaly detector 320 is to gather training input from the computer system and subsequent clusters from the feature learner 316 that are indicative of normal operation or activities. Features derived from the training input will be the reference for what "normal" computer system operation looks like. Second, each cluster induced by the training data by its centroid is represented in Euclidean space. This becomes the reference data set Dn. Next, it is assumed that some new test data is collected from the computer system and is used to create a challenge data set Dc using the aforementioned procedure. Dc may or may not contain signatures of anomalous system behaviors. To determine if anomalous activity is present an off-the-shelf novelty/outlier detector is applied to the joint data set Dn U Dc. There are a variety of choices for the detector. One-class support vector machines (SVM) are a good choice due to their simplicity. The primary parameter that needs to be chosen for the one-class SVM is the "margin", which corresponds to the probability of finding a new, but normal, observation outside the frontier of the SVM. The margin controls the false alarm rate of the detector 320. The margin is specific to the computer system being modeled and is best selected using cross-validation on the training data Dn and a test data set that contains known anomalous behavior. Once learned, the SVM is applied to the joint data set Dn U Dc and identifies the points, if any, that are anomalous. At this stage, any suitable forensic technique as understood by those skilled in the art can be applied to identify the root cause of the anomalous behavior. For example, if the anomalous behavior indicates that an abnormal number of messages (e.g., 10% greater than a daily average, etc.) are being sent from a particular node, then that node is deemed to be corrupted or a potential threat. In that instance, the system can initiate an action to minimize or neutralize the threat. For example, the system can isolate that node form the rest of the network or computer system (e.g., blocking the communication channels for the node, etc.).

As another example, an unsuspecting computer user opens an email attachment that downloads a virus onto the computer. The virus is designed to use the infected computer to send copies of itself to other computers. To do this it must access the web-browser only while it is in use to avoid detection. However, the Automatic Anomaly Detector (AAD) of the present disclosure detects that an unusual pattern of requests is being made (i.e., abnormal activities) to send data from the computer through the web-browser. Specifically, AAD determines that a typically inactive port is being used to send data and the data is being accessed from a file that did not previously exist on the system. This is enough information for AAD to issue a warning to information technology (IT) personnel that the computer may be infected and provide information about the suspicious patterns of activity.

As yet another example, a file that contains malware was uploaded onto a computer (e.g., via an infected thumbdrive, etc.). The objective of the malware is to open a backdoor into the network that the computer is connected to so that additional malicious software can be uploaded onto the network and sensitive information can be monitored and stolen. The malware must search for a backdoor and in doing so secretly accesses various programs on the computer looking for vulnerabilities. Despite the large number of programs being accessed by human users and the operating system, AAD of the present disclosure is able to detect unusual access patterns over a period of one month because it is able to connect temporally distant anomalous activities. This is enough information for AAD to determine that the patterns are unusual or abnormal and generate an alert and/or command to anti-virus software installed on the computer, which promptly removes the malware.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. An automatic anomaly detector, the automatic anomaly detector comprising:
   one or more processors and a memory, the memory being a non-transitory computer-readable medium having executable instructions encoded thereon, such that upon execution of the instructions, the one or more processors perform operations of:
   receiving a time-series of normal and abnormal activities in a computing system, the time-series of normal and abnormal activities having features related to one or more entities within the computing system;
   constructing a feature coherence graph for the features;
   clustering the feature coherence graph such that feature spaces of entities are expanded to include features that are within a same cluster but belong to separate entities;
   unifying the feature spaces by mapping representations of the features spaces into a Euclidean space comprising of feature vectors;
   aligning the feature vectors related to each feature;
   generating sets of clusters of related abnormal activities by regressing each feature vector over only those features that it possesses;
   detecting an anomalous behavior by comparing the sets of clusters to normal testing data;
   identifying a node within the computer system generating the anomalous behavior;
   initiating an action to minimize a threat posed by the node generating the anomalous behavior; and
   wherein in constructing the feature coherence graph, the nodes are features describing the entities, and between each node is an undirected connection that is weighted by mutual information of corresponding features.

2. The automatic anomaly detector as set forth in claim 1, wherein initiating an action to minimize a threat posed by the node generating the anomalous behavior includes isolating the node from the computing system.

3. A computer program product for automatic anomaly detection, the computer program product comprising:
   a non-transitory computer-readable medium having executable instructions encoded thereon, such that upon execution of the instructions by one or more processors, the one or more processors perform operations of:
   receiving a time-series of normal and abnormal activities in a computing system, the time-series of normal and abnormal activities having features related to one or more entities within the computing system;
   constructing a feature coherence graph for the features;
   clustering the feature coherence graph such that feature spaces of entities are expanded to include features that are within a same cluster but belong to separate entities;
   unifying the feature spaces by mapping representations of the features spaces into a Euclidean space comprising of feature vectors;
   aligning the feature vectors related to each feature;
   generating sets of clusters of related abnormal activities by regressing each feature vector over only those features that it possesses;
   detecting an anomalous behavior by comparing the sets of clusters to normal testing data;
   identifying a node within the computer system generating the anomalous behavior;
   initiating an action to minimize a threat posed by the node generating the anomalous behavior; and
   wherein in constructing the feature coherence graph, the nodes are features describing the entities, and between each node is an undirected connection that is weighted by mutual information of corresponding features.

4. The computer program product as set forth in claim 3, wherein initiating an action to minimize a threat posed by the node generating the anomalous behavior includes isolating the node from the computing system.

5. A computer implemented method for automatic anomaly detection, the method comprising an act of:

causing one or more processors to execute instructions encoded on a non-transitory computer-readable medium, such that upon execution, the one or more processors perform operations of:
- receiving a time-series of normal and abnormal activities in a computing system, the time-series of normal and abnormal activities having features related to one or more entities within the computing system;
- constructing a feature coherence graph for the features;
- clustering the feature coherence graph such that feature spaces of entities are expanded to include features that are within a same cluster but belong to separate entities;
- unifying the feature spaces by mapping representations of the features spaces into a Euclidean space comprising of feature vectors;
- aligning the feature vectors related to each feature;
- generating sets of clusters of related abnormal activities by regressing each feature vector over only those features that it possesses;
- detecting an anomalous behavior by comparing the sets of clusters to normal testing data;
- identifying a node within the computer system generating the anomalous behavior;
- initiating an action to minimize a threat posed by the node generating the anomalous behavior; and
- wherein in constructing the feature coherence graph, the nodes are features describing the entities, and between each node is an undirected connection that is weighted by mutual information of corresponding features.

6. The method as set forth in claim 5, wherein initiating an action to minimize a threat posed by the node generating the anomalous behavior includes isolating the node from the computing system.

* * * * *